United States Patent [19]

Keene

[11] 3,846,042
[45] Nov. 5, 1974

[54] PEDESTAL MOUNTED WIND GENERATOR
[75] Inventor: Charles I. Keene, Fontana, Calif.
[73] Assignee: Herman P. Smith, Holtville, Calif.
[22] Filed: Sept. 7, 1973
[21] Appl. No.: 394,966

[52] U.S. Cl. .............................. 416/110, 416/171
[51] Int. Cl. ........................................... B64c 27/12
[58] Field of Search ........................... 416/110, 171

[56] References Cited
UNITED STATES PATENTS

| | | | |
|---|---|---|---|
| 1,903,615 | 4/1933 | Towt | 416/110 X |
| 1,993,635 | 3/1935 | Towt | 416/95 UX |
| 3,180,570 | 4/1965 | Grabowski | 416/171 X |
| 3,288,358 | 11/1966 | Coles | 416/110 |
| 3,547,556 | 12/1970 | Keene | 416/110 |

Primary Examiner—Everette A. Powell, Jr.
Attorney, Agent, or Firm—Cahill, Sutton & Thomas

[57] ABSTRACT

A wind generator having a transmission assembly and a fan mounted on a rotatable platform on top of a pedestal is disclosed. The motive means for driving the fan through the transmission assembly is removably mounted within the pedestal to afford quick repair or replacement. The pedestal positions the fan above ground and serves as a protective housing for the motive means and may include a hydraulic fluid reservoir if the motive means is a hydraulic motor.

5 Claims, 3 Drawing Figures

3,846,042

PEDESTAL MOUNTED WIND GENERATOR

The present invention is directed to an improvement of a wind generator described in U.S. Pat. No. 3,547,556, issued Dec. 15, 1970, entitled "HYDRAULICALLY DRIVEN WIND MACHINE" and invented by Charles I. Keene.

The present invention relates to apparatus for generating a flow of air, and, more particularly, to wind machines for generating a flow of air about growing crops.

In fertile lowland areas, such as found in the Imperial Valley, Calif., the temperature of the air adjacent the ground tends to fall rapidly after nightfall. The reduced temperatures may cause damage to temperature sensitive crops. It has also been found that the air fifty to one hundred feet above the ground tends to be at a higher temperature than the air therebeneath. That is, an inversion may exist at night. Similarly, the ground, if heated by the sun, tends to retain a measure of heat far into the night. To protect the crops, it is common practice during certain times of the year to install wind generators, or as they are commonly called, wind machines, to induce a destratification of the air adjacent the ground. The turmoil created by the wind machines mixes the colder ground level air with the warmer higher air and increases the ambient temperature of the air about the crops. In addition, the heat retained by the ground tends to disipate upwardly and will heat the air flowing adjacent the surface of the ground. In this manner, the air in and about the crops are maintained at the warmest possible ambient temperature.

The wind machines previously used include a pedestal mounted impeller or fan. The driving mechanism for the fan may be an electric motor mounted atop the pedestal as shown in U.S. Pat. No. 2,736,137. In other wind machines, the motive means is ground based and has a rotating shaft extending through the pedestal to the fan, as shown in U.S. Pat. No. 3,288,358. Because of the mechanical problems attendant internal combustion motive means as used in U.S. Pat. No. 3,288,358, wind machines have been developed which incorporate hydraulic motive means. U.S. Pat. No. 3,180,570, discloses a ground based hydraulic pump operating a pedestal mounted hydraulic motor. The hydraulic motor is attached to a rotatable platform on top of the pedestal and drives the fan. Such a hydraulic system overcomes many of the structural problems attendant a mechanical drive train, however, other problems such as adequate hydraulic seals and weight considerations become evident. In addition, separate means must be incorporated to rotate the platform. In U.S. Pat. No. 3,547,556, describing a wind machine invented by the present inventor, a ground based hydraulic pump operates a hydraulic motor mounted upon a rotatable platform. The hydraulic motor operates not only the fan but includes a power takeoff for rotating the platform at a predetermined rate with respect to the rate of rotation of the fan. In this device, as with other known hydraulically driven devices, rotary couplings must be disposed intermediate the hydraulic lines secured to the pedestal and the hydraulic lines secured to the rotating platform. Such couplings are not only expensive, but are highly intolerant of particulate matter within the hydraulic fluid.

In order to economize on the massiveness of the support structure and the bearings intermediate the rotatable platform and the pedestal, it is necessary to minimize the weight of the equipment mounted on the platform and the weight of the platform itself. The advantage of minimizing the rotated weight manifests itself in lower power requirements while retaining the air moving capacity of the fan, or a greater proportion of the available power may be applied to the fan itself.

It is therefore a primary object of the present invention to minimize the weight of the apparatus supported by the rotatable platform of a wind generator.

Another object of the present invention is to provide a wind generator having a hydraulic motor mounted within a pedestal and driving a fan mounted upon a rotatable platform.

Still another object of the present invention is to provide a mechanical power transfer means between motive means within a pedestal and a transmission mounted on a rotatable platform at the top of the pedestal.

Yet another object of the present invention is to provide hydraulic power means operating through a mechanical transmission to rotate the fan of a wind generator.

A further object of the present invention is to provide a wind generator powered by an easily replaceable hydraulic motor, electric motor, or internal combustion engine.

A still further object of the present invention is to provide a wind generator having a compartmentalized pedestal for individually housing a hydraulic motor and the hydraulic fluid for the motor.

A yet further object of the present invention is to provide an easily replaceable motive means for a wind generator without necessitating the removal of the transmission, disassembly of the drive train to the fan, or disconnection of the platform rotating mechanisms when the motive means is replaced.

These and other objects of the present invention will become apparent to those skilled in the art as the description thereof proceeds.

The present invention may be described with greater specificity and clarity with reference to the following drawings, in which.

Figures 1, 3:
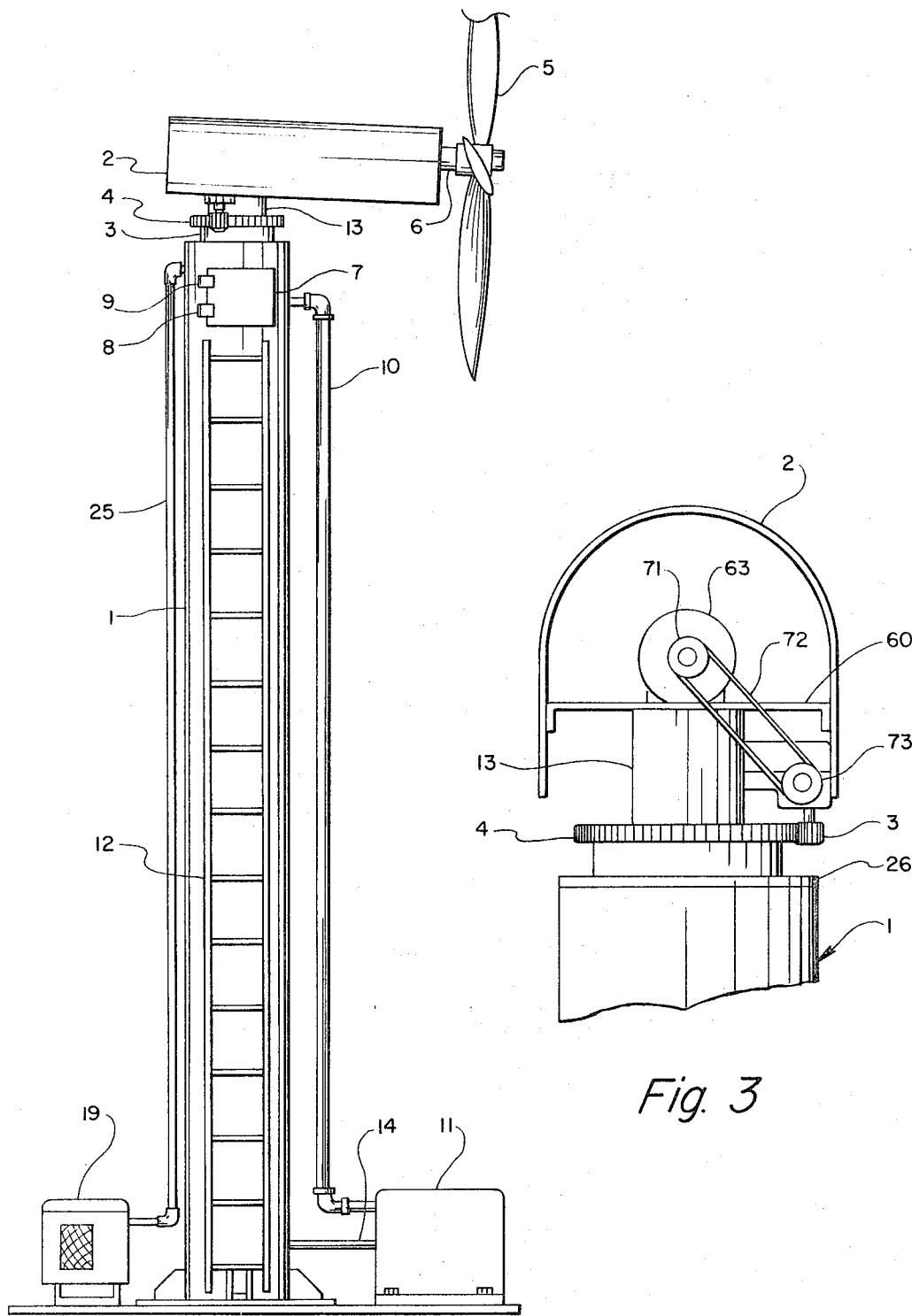
FIG. 1 illustrates an overall view of the present invention.
FIG. 3 illustrates further detail of the drive mechanism for braking the rotation of the platform.

Referring to FIG. 1, there is shown a cylindrically shaped pedestal 1 mounted upon the ground. A housing 2 is rotatably secured to a rotatable support assembly 13 mounted at the upper extremity of pedestal 1. Housing 2 encloses a gear box rotating a fan 5 by means of a shaft 6. A mechanically driven pinion gear 4 extends downwardly from within the rear of housing 2 and mates with ring gear 4. The latter is fixedly mounted at the top of pedestal 1.

A hatch 7 is hingedly attached to the upper part of pedestal 1 by means of hinges 8 and 9. Hatch 7 provides access to a compartment within pedestal 1, which compartment houses the motive means connected to the transmission within housing 2. A ladder 12 is mounted external to pedestal 1 for the convenience of maintenance and repair men.

The motive means connected to the transmission may be hydraulic motor, an electrical motor, or an internal combustion engine. These motive means may be interchangeably mounted within the compartment in pedestal 1 behind hatch 7.

If the motive means is a hydraulic motor, a hydraulic pump and its drive mechanism, represented by the numeral 11, is mounted on the ground generally adjacent the base of pedestal 1. A high pressure hydraulic line 10 extends from pump 11 to the upper portion of pedestal 1 and into the compartment housing the hydraulic motor. The return line from the hydraulic motor may be connected directly to the intake line of pump 11. Alternatively, the space interior pedestal 1 beneath the compartment for the motive means may be configured as a hydraulic fluid reservoir. In the latter case, the return line would empty directly into the reservoir. A hydraulic fluid pickup line 14 is connected intermediate the bottom of the reservoir and the imput to the hydraulic pump 11.

Should the motive means within pedestal 1 be an electric motor, a ground based power supply 19 is located in proximity to the base of the pedestal. The necessary electrical cables to provide the electric motor with power would be routed from power supply 19 through conduit 25 to the motive means compartment.

If an internal combustion engine is used as the motive means, the previously described hydraulic reservoir may be used to house the fuel for the engine. The necessary engine controls are routed to a ground based control panel.

Figure 2:
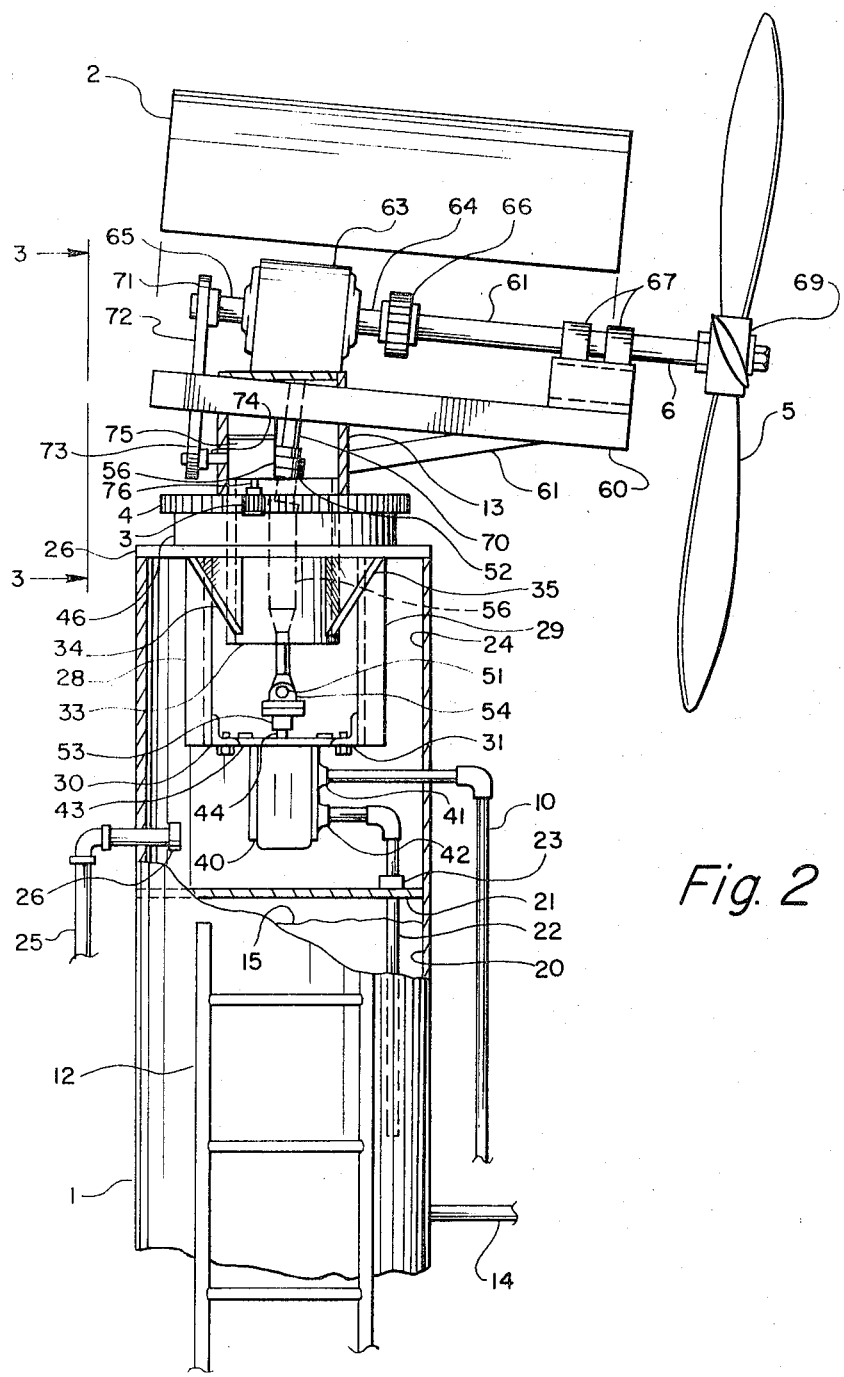
FIG. 2 illustrates the constructional details of the rotatable platform and the upper portion of the pedestal.

In the preferred embodiment, a hydraulic motor is used to drive the fan and rotate the support assembly for the fan. The previously described motive means compartment is shown more clearly with reference to the cut-away portion of pedestal 1 shown in FIG. 2. A bulkhead 21 extends interior to and across the upper end of pedestal 1 to define a lower compartment 20 and an upper compartment 24. The lower compartment 20 stores the hydraulic fluid, the level of which is represented by numeral 15. The upper compartment 24 coincides with the previously discussed motive means compartment within which a hydraulic motor 40 is mounted. A cover 26 extends across the upper end of pedestal 1 and defines the upper end of compartment 24. Supports 28 and 29 extend downwardly from cover 27. Flanges 30 and 31, which may be angle irons, are secured to supports 28 and 29 and serve as the attachment point for mounting plate 43 of motor 40. Hydraulic line 10 extends into compartment 24 through the wall of pedestal 1 and is attached to the inlet 41 of hydraulic motor 40. A pipe 22 is secured to outlet 42 of hydraulic motor 40 and extends through bulkhead 21 into lower compartment 20. A seal 23 is disposed about pipe 22 adjacent bulkhead 21. The output shaft 44 of motor 40, including a flange coupling 53 secured thereto, extends vertically upwardly.

A hollow cylinder 33 extends upwardly from within compartment 24 through an aperture within cover 26. Gussets 34 and 35 are disposed intermediate cylinder 33 and cover 26 to support and maintain the cylinder as a rigid part of cover 26. The support assembly 13 partially mates with and encircles cylinder 33. Bearings and seals (not shown) are disposed intermediate cylinder 33 and assembly 13 to support the assembly on the cylinder while permitting rotation of the assembly with respect to the cylinder.

Platform 60 is secured to assembly 13 and includes a brace 61 to provide further support. It may be noted that platform 60 is at an angle with respect to the longitudinal axis of assembly 13. The reason for the angular orientation will become apparent as the description of the invention proceeds.

A gear box 63 is mounted atop assembly 13. The input shaft 70 extends downwardly from the gear box interior to assembly 13. A flange coupling 56 is secured to the extremity of shaft 70. A drive shaft 50 is disposed intermediate shafts 44 and 70. Drive shaft 50 includes flange couplings 54 and 55 disposed at either end to mate with flange couplings 58 and 56, respectively. Universal joints 51 and 52 are a part of flange couplings 54 and 55, respectively, to accommodate for any misalignment between shafts 44 and 70.

A first output shaft 64 of gear box 63 is attached to shaft 6 via a flexible coupling 66. Shaft 6 is supported and maintained in place by pillow block 67 extending from platform 60. The flexible coupling 66 is inserted to accommodate any inadvertent misalignment between shaft 64 and shaft 6. The hub 69 of fan 5 is secured to the extremity of shaft 6.

The torque exerted by the drive shaft 50 upon gear box 63 due to the air drag on fan 5 will tend to cause rotation of the support assembly 13. The means for controlling or braking the rate of rotation of support assembly 13 will be described with reference to FIGS. 2 and 3. A pulley 71 is mounted on a second output shaft 65 of gear box 63. Pulley 71 drives a second pulley 73 by means of a belt 72. It is to be understood that the pulley and belt drive may be replaced by a sprocket and chain or a gear drive. Pulley 73 is mounted upon input shaft 74 of a second gear box 75. Pinion gear 3 is secured to the output shaft 76 from gear box 75 and the pinion gear mates with ring gear 4. The vertical position of ring gear 4 with respect to pedestal 1 is variable and is primarily dependent upon the relative vertical dimensions of the drive mechanisms intermediate pinion gear 3 and shaft 65. In the embodiment shown, ring gear 4 is slightly raised from cover 26 and is rigidly secured thereto by cylindrical support 46.

In operation, when pump 11 (see FIG. 1) is actuated, hydraulic fluid will flow through pipe 10 into hydraulic motor 40 and actuate the latter causing shaft 44 to rotate. The rotation of shaft 44 is translated through drive shaft 50 and gear box 63 to rotation of fan 5. The rate of rotation of fan 5 is, of course, a function of the rate of hydraulic fluid pumped into motor 40 as well as the gear ratios of gear box 63. Simultaneously, the tongue acting upon the support assembly 13 will tend to cause pinion gear 3 to rotate about ring gear 4 as the two gears are in mesh. The mechanical interconnection between pinion gear 3 and output shaft 65 will prevent rotation of the pinion gear without a corresponding rotation of the output shaft 65. Thereby, the rate of rotation of the support assembly 13 is a function of the rate of rotation of output shaft 65 and limited thereby. The relative rates of rotation may be varied by altering the gear ratio intermediate the ring gear 4 and output shaft 65. It may thus be understood that the fan 5 will generate a flow of air along the axis of shaft 6 and about the pedestal at a controlled angular rate.

It has been determined through experimentation that the most effective destratification of the inversion layer occurs if the force of air is directed slightly downwardly toward the ground from a pedestal mounted fan. In the past, the downward orientation has been obtained by using a flexible coupling intermediate the horizontally oriented motor drive shaft and the fan drive shaft to orient the axis of the fan non-parallel with the ground. The flexible coupling serves this purpose but consumes power and is usually subject to high wear. In the present invention, the platform 60 is non-horizontally mounted upon the pedestal. With such mounting, it is possible to maintain the output shaft of the gear box and the shaft connected to the fan in alignment and yet have the axis of the fan pointed toward the ground. The universal joints intermediate the output of the motive means and the input to the transmission accommodate the slight but necessary misalignment therebetween when standard off-the-shelf items are used.

As discussed above, the motive means for the present invention may be readily interchangeable by simply replacing the motor within compartment 24. The replacement may occur due to a breakdown of an existing motor or if the type of motor is to be changed. The motor replacement can be simply and easily effected by simply opening hatch 7 to provide access to compartment 24. The mounting plate 43 is disengaged from supports 30 and 31 and the output shaft 44 is disengaged from the drive shaft. The attendant hydraulic connections within compartment 24 must also be disconnected. The motor 40 may then be withdrawn through the opening covered by hatch 7 and the replacement motor inserted and mounted. It is to be noted that neither the drive train, the gear boxes nor any of the seals and bearings need be disturbed, except for the hydraulic fluid couplings. Thus, the configuration of the elements of the present invention provide a substantial time savings should it be necessary to replace the motive means.

A further advantage not immediately apparent is that the number and weight of the elements mounted upon assembly 13 have been mimimized to the bare essentials. By obviating the need for rotating the motor as well as the drive train, the bearings and support for the rotatable assembly can be reduced in size and strength. Hence, the production costs of the present invention are substantially less than that of existing wind machines. As the rotating weight has been reduced, the power requirements are also reduced. Lower power capacity and therefore less expensive motive means can be used than with prior art wind generators.

Where electrical power is cheap and readily available, it may be more expeditious to incorporate an electric motor rather than a hydraulic motor as the motive means. With the present invention, the hydraulic motor 40 may be easily replaced by an electric motor. The only adaptations needed are that of attaching an appropriately configured mounting plate to the electric motor to permit it to be mounted upon supports 30 and 31. It is assumed that the electric motor output shaft is readily mateable with drive shaft 50. The power for the electric motor may be conveyed from the ground through power cables disposed within conduit 25. The conduit 25 extends into compartment 24 through the wall of pedestal 1 (see FIG. 2). The outlet of conduit 25 may be in the form of a female socket 26, which socket mates with an electrical plug connected to the electrical motor.

Alternately, an internal combustion engine may be mounted within compartment 24 and connected to drive shaft 50. Again, the only modification necessary to the engine is that its mounting lugs are compatible with supports 30 and 31. The necessary control cables may be routed external to pedestal 1 to a ground based control panel. If an internal combustion engine is incorporated in the present invention, compartment 20 may be used as the fuel tank for the engine.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A wind generator for generating a flow of air in and about crops, said wind generator comprising in combination:
   a. a hollow vertically aligned pedestal mounted upon the ground, said pedestal including a sealed lower compartment and a sealed upper compartment;
   b. a support assembly rotatably mounted on top of said pedestal;
   c. a platform mounted on said support assembly, said platform being non-perpendicularly oriented with the vertical axis of said pedestal;
   d. a shaft carrying a fan, said shaft being journaled on said platform parallel to said platform, whereby the flow of air induced by said fan will be essentially aligned with said platform;
   e. motive means disposed within said upper compartment for producing power to rotate said fan, said motive means including:
      1. a mounting plate for securing said motive means within said upper compartment;
      2. a vertically oriented output shaft parallel to the axis of said pedestal; and
      3. control means for regulating the operation of said motive means in response to the output of a ground based control unit;
   f. a power train disposed intermediate said motive means and said fan, said power train including:
      1. a gear box mounted on said platform and having an input shaft extending downwardly perpendicular to said platform and at least one output shaft, each said output shaft being parallel to said platform;
      2. a drive shaft intermediate said output shaft of said motive means and said input shaft of said gear box, said drive shaft including universal joints to accommodate the misalignment between said output shaft of said motive means and said input shaft of said gear box;
      3. a flexible coupling interconnecting said shaft of said fan and one of said output shafts of said gear box to accommodate inadvertent misalignment therebetween;
   g. a housing secured to said platform for protecting said gear box and said shaft of said fan; and
   h. control means for rotating said support assembly as a function of the rate of rotation of said drive shaft; whereby, energization of said motive means actuates said fan to produce a flow of air in alignment with said platform and toward the ground to destratify the air around said pedestal while said platform rotates about the axis of said pedestal.

2. The combination as set forth in claim 1 wherein said motive means comprises a hydraulic motor.

3. The combination as set forth in Claim 2 including:
   a. a ground based source of pressurized hydraulic fluid for operating said hydraulic motor;
   b. a first hydraulic line extending from said source to said upper compartment for conveying hydraulic fluid under pressure;
   c. a second hydraulic line extending from said upper compartment into said lower compartment or conveying hydraulic fluid;
   d. hydraulic fluid disposed within said lower compartment;
   e. a third hydraulic line extending from said lower compartment to said source for conveying hydraulic fluid; and
   f. means for connecting said first and second hydraulic lines to said hydraulic motor.

4. The combination as set forth in claim 3 further including an opening in the wall of said pedestal coincident with said upper compartment to provide access to said hydraulic motor and a hatch for sealing said opening.

5. The combination as set forth in claim 4 wherein said control means comprises:
   a. a further output shaft extending from said gear box;
   b. a further gear box secured to said support assembly including an input shaft and an output shaft;
   c. first means for interconnecting said further output shaft and said further gear box input shaft;
   d. a ring gear secured to said pedestal; and
   e. second means for interconnecting said further gear box output shaft and said ring gear; whereby, said support assembly rotates with respect to said pedestal as a function of the rate of rotation of said further output shaft.

* * * * *